United States Patent [19]

Andreoli et al.

[11] Patent Number: 5,605,770
[45] Date of Patent: Feb. 25, 1997

[54] SUPPLY SYSTEM FOR FUEL CELLS OF THE S.P.E. (SOLID POLYMER ELECTROLYTE) TYPE FOR HYBRID VEHICLES

[75] Inventors: Giuseppe L. Andreoli, Alessandria; Flavio Federici, Genoa, both of Italy

[73] Assignee: Finmeccanica S.p.A. Azienda Ansaldo, Genoa, Italy

[21] Appl. No.: 613,836

[22] Filed: Mar. 11, 1996

[30] Foreign Application Priority Data

May 4, 1995 [EP] European Pat. Off. ............ 95830179

[51] Int. Cl.$^6$ .................................................. H01M 8/04
[52] U.S. Cl. .................. 429/20; 429/24; 429/25; 429/26
[58] Field of Search .................. 429/19, 20, 22, 429/24, 25, 26, 30, 34, 12

[56] References Cited

U.S. PATENT DOCUMENTS

| | | | |
|---|---|---|---|
| 3,268,364 | 8/1966 | Cade et al. | 429/23 |
| 3,379,572 | 4/1968 | Gay | 429/26 X |
| 4,729,930 | 3/1988 | Beal et al. | 429/13 |
| 5,041,344 | 8/1991 | Kamoshita et al. | 429/26 |
| 5,187,024 | 2/1993 | Matsumura | 429/24 |

FOREIGN PATENT DOCUMENTS

| | | | |
|---|---|---|---|
| 1583419 | 10/1996 | France. | |
| 58-165272 | 9/1983 | Japan | H01M 8/06 |
| 61-085775 | 5/1986 | Japan | H01M 8/06 |
| 63-241878 | 10/1988 | Japan | H01M 8/06 |
| 4043567 | 2/1992 | Japan | H01M 8/04 |
| 213108 | 7/1984 | United Kingdom | B01J 8/02 |
| WO93/18556 | 9/1993 | WIPO | H01M 8/04 |

OTHER PUBLICATIONS

Nicholas E. Vanderborgh et al., *PEM Fuel Cell Stack Heat and Mass Management*, (Proceedings of the 27th Intersociety Energy Conversion Engineering Conference, vol. 3, P–259, pp. 3.407–3.411, Aug. 3–7, 1992).

*Primary Examiner*—Anthony Skapars
*Attorney, Agent, or Firm*—Sheridan Ross P.C.

[57] ABSTRACT

A supply system for fuel cells of the solid polymer electrolyte type for vehicles, including a primary cooling and humidifying circuit with demineralised, pressurised water with a small volumetric capacity and a secondary liquid cooling circuit with plate exchangers for cooling the demineralised water of the primary circuit and air/liquid exchangers for cooling compressed air for supply to the cells, the system further including an electric heater for heating the liquid in the secondary circuit so that the cells can be put into service quickly and means for recycling hydrogen leaving the cells to make the optimum use of the fuel.

10 Claims, 3 Drawing Sheets

SUPPLY SYSTEM FOR FUEL CELLS OF THE S.P.E. (SOLID POLYMER ELECTROLYTE) TYPE FOR HYBRID VEHICLES

BACKGROUND OF THE INVENTION

The present invention relates to a supply system for fuel cells of the solid polymer electrolyte type for hybrid vehicles.

It is known that technology in the transport field has been directed most recently towards the use of electric motors instead of internal combustion engines because of the high output of the former and because they have practically no impact on the environment.

In order to power the electric motors of transport vehicles it has been proposed to use fuel cells which are able to supply the average daily power required by the transport system, supplemented by the use of buffer batteries to provide the peak power required.

Of the fuel cells, the solid polymer electrolyte type, which operate at a temperature of the order of 70°–120° C., appear to be the most suitable for this type of use.

As is known, fuel cells make use of the exothermic oxidation reaction of hydrogen (or of gases containing hydrogen) with oxygen (generally oxygen in the air) with a conversion yield of the order of 40%.

It is thus clear that a fuel cell (or more properly a battery or stack of fuel cells) of such a dimension that it can produce electric power of the order of 60 KW which may be required by an urban transport vehicle such as a bus, and considering the losses due to incomplete combustion, develops a thermal horsepower of the order of 60–80 KW which must be dissipated to a great extent to ensure the necessary working conditions for the fuel cell.

Cooling is achieved by demineralised water which is circulated in the fuel cell and which also ensures the humidification of the catalytic membranes of the fuel cell, which is essential for them to function correctly.

The cooling water, partially consumed and dispersed in the humidification section by transport in the gases discharged from the cell, is supplemented by the recovery of some of the water produced in the cell by the oxidation reaction and must in turn be cooled by means of radiators so as to give up its heat to the ambient air.

To ensure that the fuel cell works efficiently in relation to its dimensions, it is necessary for it to operate at a pressure above atmospheric, and of the order of 3.5 bars absolute This means that the cell must be supplied with hydrogen, air for combustion and cooling water at this pressure and at an optimum inlet temperature of the order of 70° C.

The adiabatic compression of the air from the ambient temperature and pressure to the working conditions results in a temperature rise of the order of about 80° C. degrees so that, in general, the compressed air must also be cooled.

It is thus necessary to provide heat exchangers which are able to contain a pressurised fluid (water or compressed air) and are at the same time efficient and, at least in the case of compressed air, to provide shut-off and bypass members for the exchanger which must not only operate under pressure but must also ensure, with minimum load losses, relatively high flow rates of the order of 20–25 litres per second of air at standard atmospheric pressure (ten litres per second at the operating pressure).

The apparatus thus becomes bulky and expensive and it is difficult to satisfy the requirements of compactness and safety which the plant must have.

A further problem is constituted by the fact that although from a theoretical point of view, all the hydrogen supplied may be used in the conversion reaction, in order to achieve an acceptable yield from fuel cells in terms of voltage and current supplied, it is necessary for twice the stoichiometric quantity of hydrogen to be supplied.

It is known that the excess hydrogen, partially exhausted, is discharged periodically to the exterior, with a not inconsiderable loss.

SUMMARY OF THE INVENTION

The present invention remedies these problems to a large extent and provides a supply system for fuel cells in which a secondary liquid cooling circuit substantially at ambient pressure provides both for the cooling of the cooling and humidifying water both for the cooling of the compressed air, whilst also heating the gaseous hydrogen, with efficient, compact exchangers, the heat exchange with the environment occuring between the secondary fluid and ambient air in a single radiator in which the secondary fluid circulates at a pressure substantially equal to the ambient pressure.

The shut-off and control members for the cooling, except possibly those regulating the temperature of the humidifying and cooling circuit of the fuel cell, act on the secondary cooling circuit, with benefits as regards the safety and economy of the system.

A further advantage is constituted by the fact that the volume of the primary cooling and humidifying circuit is very small which enables it to respond more promptly to regulation and the system to be brought into service rapidly, with the minimum expenditure of energy.

In a transport vehicle which is in discontinuous service, with nightly stoppages, the problem of how to start up the system on a daily basis in a short period of time cannot be ignored.

In known systems, the start-up is effected by supplying the system with hydrogen and air at gradually increasing pressures.

The heat of the reaction gradually brings the system up to the working conditions, with a rate of temperature rise which is initially very low but then increases.

The start-up period is thus very long, of the order of tens of minutes.

According to a further aspect of the present invention, an electric heater is provided in the secondary cooling circuit which operates in a preheating phase to bring the fuel cell to a temperature of 50° C. in accordance with a practically linear law before the system is started up.

By virtue of the small capacity of the primary cooling circuit in relation to the heat capacity of the cell and the linear law of variation of the temperature achieved with the constant supply of power from the electric heater, the working temperature is reached in a very short time, of the order of minutes without thermal stress on the cell and with very little expenditure of heating energy.

According to a further aspect of the present invention, the supply system includes a fan (constructed especially to deal with hydrogen) which operates continuously to recycle the quantity of hydrogen in excess of the stoichiometric quantity not consumed in the cell, uniting it with the stoichiometric quantity fed from a supply reservoir, enabling the cell to be supplied with a quantity of fuel which is more than required and, by way of example, may be twice the stoichiometric quantity.

This gives the cell greater efficiency, reducing venting operations theoretically to zero, in practice to a minimum.

BRIEF DESCRIPTION OF THE DRAWINGS

The characteristics and advantages of the invention will become clearer from the following description of a preferred embodiment and from the appended drawings, in which.

DETAILED DESCRIPTION OF A PREFERRED EMBODIMENT

Figure 1:
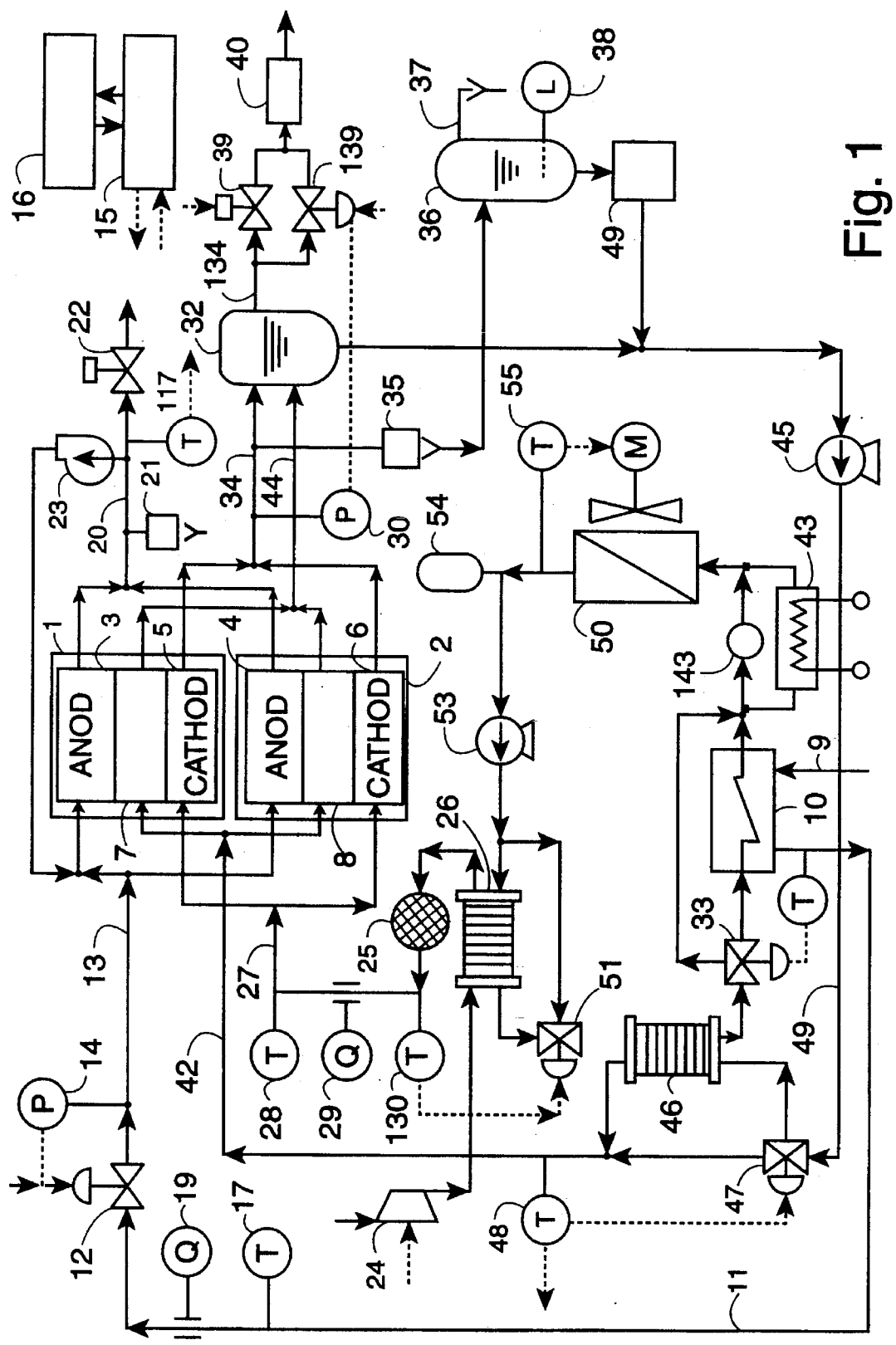
FIG. 1 is a schematic drawing of the entirety of the supply system in accordance with the present invention.

With reference to FIG. 1, the system includes a fuel cell constituted by a plurality of units shown, by way of example and for simplicity, by the numbers 1, 2, a subsystem for the supply of hydrogen, a subsystem for the supply of air, a primary cooling and humidification circuit for the cell and a secondary cooling circuit. The cell units are each constituted, in known manner, by an anode ANOD 3, 4, and a cathode CATHOD 5, 6, separated by a cooling section 7, 8 and including a solid-polymer-electrolyte catalytic membrane.

The hydrogen-supply subsystem includes a hydrogen delivery line 9 for delivering hydrogen from a pressurised tank of liquid hydrogen to the inlet of a gas/liquid heat exchanger 10 which the hydrogen leaves as a gas. Alternatively, the hydrogen may be generated by a reforming system.

The outlet of the exchanger 10 is connected to a supply line 11 which supplies the anodes of the fuel cell through a control valve 12, a primary manifold 13 and distribution lines which are suitably balanced to ensure a uniform distribution of the hydrogen to the various cell units.

The valve 12 is controlled jointly by a pressure sensor 14 and a signal generated by a central processing unit 15 which governs the whole system by means of suitable signals in accordance with signals received from the system and commands received from a dashboard 16 controlled by the driver.

Temperature sensors 17, 117, a pressure sensor 14 and a flow sensor 19 on the manifold 13, the supply line 11 and at the outlet of the cell provide the central processing unit 15 with information which is used in the control of the system.

The anodic outlets of the cell units are connected by manifolds to a main discharge manifold 20 to which are connected a receiver/discharge vessel 21 for condensed liquid and a valve 22 for discharging exhaust gases, with the double function of discharging periodically the exhaust gases and any excess hydrogen.

The valve 22 is also controlled by the central processing unit 15.

A fan 23 connected at its inlet side to the manifold 20 and at its outlet side to the manifold 13 recycles any hydrogen in excess of the stoichiometric quantity and not consumed in the cell.

The fan 23 is driven continuously. The valve 22 is opened intermittently for a period of the order of a couple of seconds every 30–60 seconds in order to evacuate the exhaust hydrogen and prevent over-pressurising.

The heat exchanger 10 ensures that the hydrogen is output at a temperature of the order of 25° C. this then being mixed with a substantially equal quantity of hydrogen at 70° C. provided by the recycling system so that the hydrogen introduced into the cell is at a temperature of about 40°–50° C.

Obviously, all parts of the hydrogen-supply subsystem which are contacted by the hydrogen are of stainless steel AISI 316 in order to minimise the contamination of the gas and all the electrical apparatus in contact with the hydrogen has built-in safety features to guard against explosion.

The air-supply subsystem includes a centrifugal compressor 24 which draws air from the environment, compresses it to a pressure of about 3.5 bars absolute and delivers it to a secondary air/cooling-liquid heat exchanger 26 which lowers the temperature of the air to values of the order of 70° C. and then delivers it from the exchanger to a filter 25.

The air, thus cooled and filtered, is passed through a manifold 27 and balanced distribution lines to the cathode sections of the fuel cell.

Again in this case, a temperature sensor 28 and a flow sensor 29 acting on the manifold 27 and a pressure sensor 30 acting at the cathode outlets of the cell provide the control unit 15 with signals which are used for controlling the system.

The cathode outlets of the fuel cell are connected through manifolds to a main exhaust manifold 34 having a condensate receiver 35 which discharges water formed by the oxidation reaction into a holding tank 36.

The cathode outlets are also connected to a line 31 for pressurising the primary cooling circuit and which supplies a pressurising reservoir 32 and, through this, an exhaust line 134 for the cathode exhaust.

The tank 36 has an overflow 37 and minimum level indicator 38 which transmits a corresponding signal to the unit 15.

The exhaust line 134 which carries the cathode exhaust, which comprises essentially atmospheric nitrogen and residual oxygen, is connected through a parallel system constituted by two arms controlled respectively by an on/off valve 39 and a pressure regulator valve 139 to an exhaust silencer 40 open to the atmosphere.

The valves 39 and 139 are controlled jointly by the pressure sensor 30 connected to the manifold 34 and by the unit 15 and serve to control and regulate the pressure at the cathodes of the fuel cell.

In the starting phase, the valve 39 is closed and the valve 139 is kept open for the time needed to wash the cell, after which it is controlled to regulate the pressure of the system.

The primary cooling and humidification circuit, which operates with demineralised water, includes a delivery line 42 which supplies the cooling sections 7, 8 of the fuel cell through balanced distribution lines, the outlets of the fuel cell being connected to a manifold 44 connected to the pressuriser 32 which is in turn connected to the inlet of a recycling pump 45.

The outlet of the recycling pump is connected to the inlet of a three-way valve 47, the outlets of which are connected respectively to the delivery line 42 and to the inlet of a plate exchanger 46 the outlet of which is also connected to the delivery line 42.

The valve 47 is controlled by a temperature sensor 48 connected to the delivery line 42 to direct the cooling water directly from the outlet of the pump 45 to the delivery line 42, bypassing the exchanger 46.

The valve 47 allows the flow of demineralised water into the exchanger 46 to be divided and, if necessary, excluded completely so as to keep the water at the inlet to the cell at a temperature of the order of 70° C.

The primary cooling circuit is kept at the air pressure required for delivery to the cell by means of the pressuriser 32.

Since a certain quantity of cooling water is consumed, in the humidification section and passes into the cathode and anode sections, it is necessary for it to be replaced and this is effected by a metering pump 49, the outlet of which is connected to the manifold 34 while its inlet is connected to the tank 36 for collecting the reaction water.

The use of a plate heater, with a high efficiency and minimum volumetric capacity and the use of the container 32 exclusively as a pressuriser and not as a holding tank, this function being carried out by the tank 36, minimises the volumetric capacity of the primary cooling circuit and thus makes the response of the circuit to temperature regulation and the achievement of working conditions particularly rapid.

On starting, when the cooling water is at a temperature below the working temperature, the heating element 43 is switched on to bring the cells rapidly to the operational temperature ranger with minimum expenditure of energy by virtue of the small thermal inertia and thermal capacity of the circuit compared with those of the cells.

The main function of the secondary cooling system is to remove heat from the cooling system of the fuel cells while, in the second place, it is used to cool the air coming from the compressor before it is supplied to the cells and it has a secondary function of heating the hydrogen from a reservoir up to the working temperature.

The secondary cooling circuit is a closed circuit, the cooling fluid being constituted by water and glycol which circulates in a water/air radiator 50 where it is cooled by a forced air flow created by a fan 151 and then passes to a recycling pump 53 which serves solely to overcome load losses.

From the pump 53 the cooling fluid enters a water/air plate exchanger 26 (where the combustion air is cooled) in quantities which are regulated by a three-way valve 51 in accordance with the temperature of the combustion air.

The secondary cooling fluid then passes to the water/water plate exchanger 46 where the demineralised water of the primary circuit is cooled: in this case, as already stated, the three-way valve 47 regulates the quantity of primary cooling liquid which enters the exchanger in dependence on the temperature of the demineralised water.

From the exchanger 46, the secondary cooling fluid passes to the water/hydrogen plate exchanger 10 (where the hydrogen is heated) in quantities regulated by a three-way valve 33 in dependence on the temperature of the hydrogen. From the exchanger 10, the secondary fluid returns to the radiator 50, closing the circuit.

Between the exchanger 10 and the radiator 50 are two connectors to which an electric heater 43 is connected by rapid couplings.

A ball valve 143 interposed between the rapid couplings in the secondary circuit ensures the continuity of the secondary circuit when open and the passage of the secondary fluid into the heater when closed.

The removability of the heater 43 helps to minimise the capacity of the secondary cooling circuit, the load losses in the circuit under normal working conditions and the bulk of the fixed installation.

A surge tank 54 allows the thermal expansion of the fluid in the circuit, which operates at ambient pressure at a working temperature between 55° and 65° C.

A temperature sensor 55 activates the fan 151 if the temperature should rise too high.

An open loop control system is thus achieved which is sufficiently precise for the requirements while at the same time being steady.

In the secondary cooling circuit the cascade arrangement of the exchanger for cooling the compressed air, the cooling plate exchanger for cooling the water of the primary cooling circuit and the exchanger for heating the hydrogen minimises the need for regulation.

By way of example, in practice, the heat exchanged in the exchanger 26 is, in the worst case, 15% of the heat exchanged in the plate exchanger 46 and may fall to practically zero in winter conditions.

Heat exchange in the exchanger 10 is negligible.

The variation in the temperature of the secondary cooling fluid at the inlet to the cascade of exchangers and the outlet thereof is thus determined essentially by the exchanger 46.

At a constant flow, ensured by the pump 53, which may suitably be of the order of one l/s, it suffices to control the delivery temperature of the cooling fluid to an average value of 55°–60° C. to achieve, even when the fuel cells are supplying maximum power, a temperature at the outlet of the series of exchangers which does not exceed 70°–75°C., with a very small temperature excursion.

Since the plate exchanger operates in countercurrent, the temperature of the primary cooling fluid leaving the exchanger 46 may easily be controlled to a value of the order of 70° C. with a temperature exchange between the two fluids of not less than 10° C. degrees.

Figure 2:
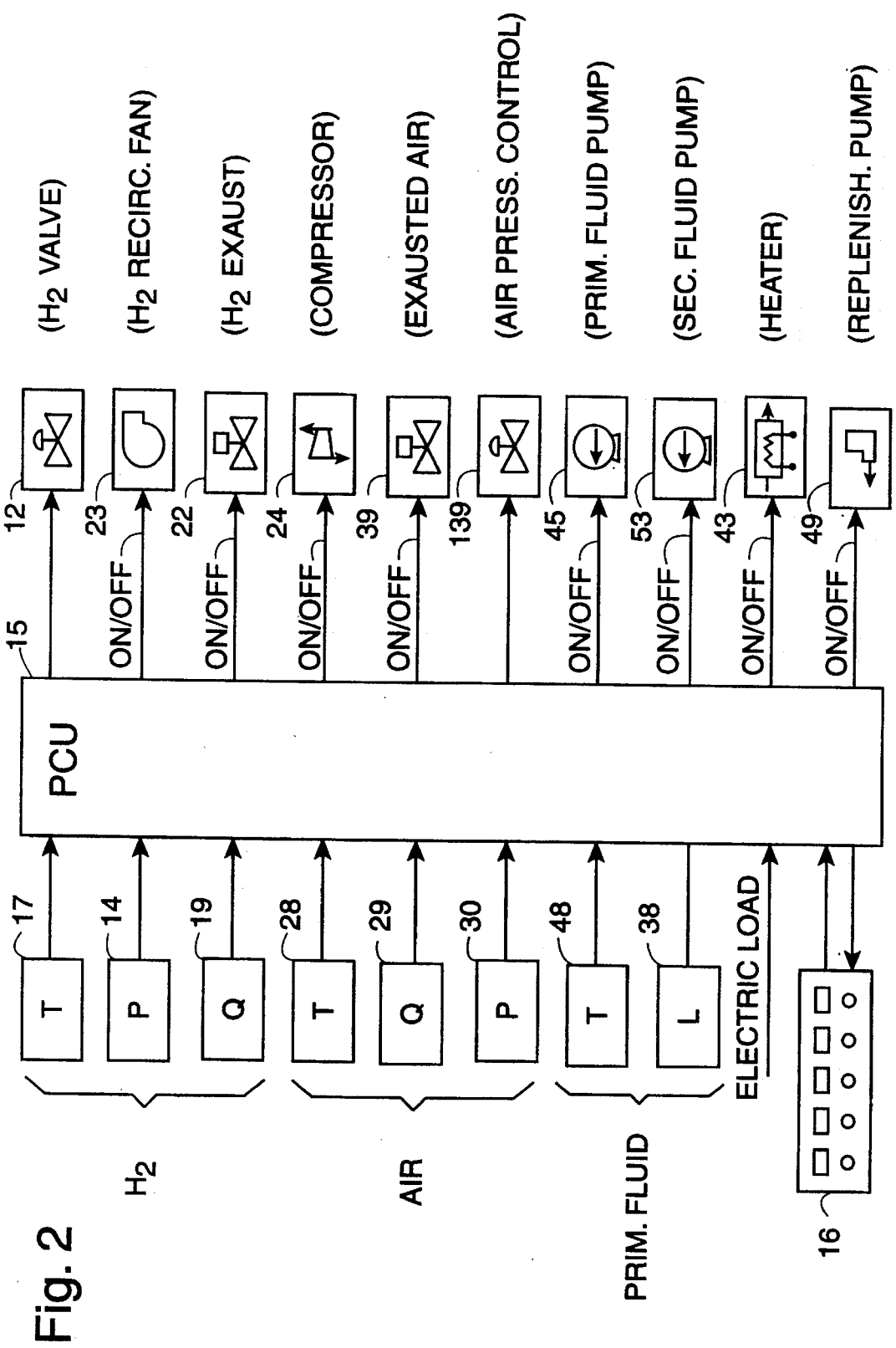
FIG. 2 is a block-schematic drawing of the entirety of a central processing unit for the system of FIG. 1.

FIG. 2 is a block-schematic diagram showing a preferred embodiment of a system for controlling the supply system described.

The control system includes a central processing unit 15 to which the various pressure, temperature and flow sensors 14, 17, 19, 28, 29, 30, 48 and level sensor 38 send signals which they generate, these signals being converted, in the case of analog signals, into binary code by means of analog-digital converters incorporated in the central processing unit.

In dependence on suitable programs and the cell load, the unit 15, by means of duration-modulated on/off logic signals or amplitude modulated analog signals, controls the opening and closing of the various regulator valves 12, 22, 39 and the activation of the various drive members 23, 24, 45, 53 and heating members 43.

Several regulator elements of the primary and secondary cooling circuits do not require programmed control but are activated independently by thermostat.

Figure 3:
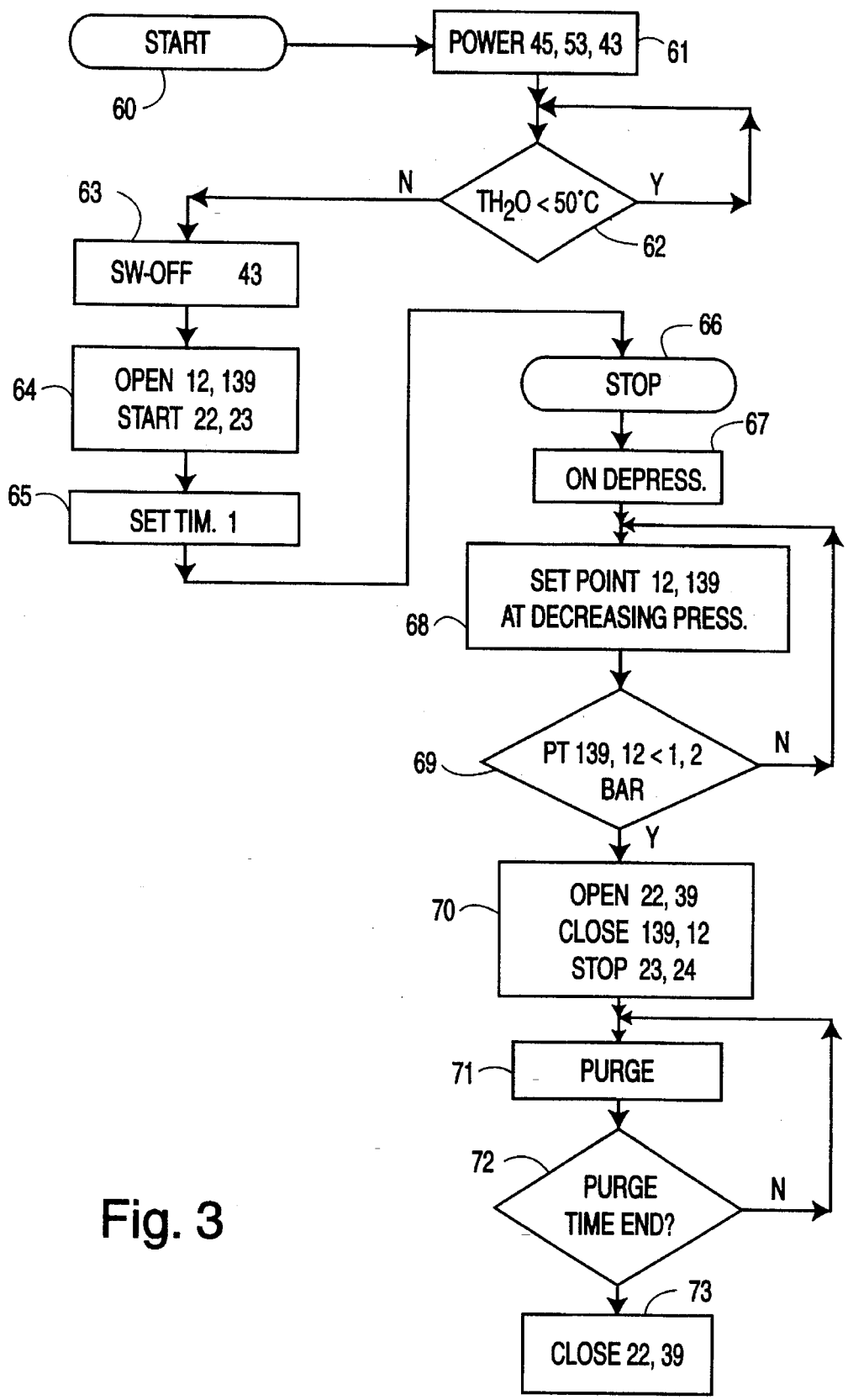
FIG. 3 is a flow diagram of the unit of FIG. 2 for controlling the bringing of the fuel cell into service and its working conditions to give the optimum performance.

FIG. 3 is a flow diagram showing several significant aspects of the control process developed to put the system into service and to control the hydrogen flow in an optimum manner.

The starting of the process is instigated by a START command by an operator (block 60).

Following the START command, the unit 15 switches on the recycling pumps 45, 53 which recycle the primary and secondary cooling fluids and simultaneously switches on the heating element 43 (block 61: POWER 45, 53, 43).

The pre-heating is preferably carried out with the primary circuit at ambient pressure and the compressor 24 inactive.

The control unit checks the temperature of the primary cooling fluid (block 62: $TH_2O<50°$ C.) by means of the sensor 48.

When the temperature reaches 50° C. the fuel cell is at a temperature ready to be put into service and the heating element 43 is switched off (block 63: SW-OFF 43).

The compressor 24 and the recycling unit 23 are then switched on and the valves 139 and 12 placed under automatic control so as to cause the fuel cells to be washed with fresh air brought to a temperature of 70° C. (block 64: OPEN 139, 12, START 24, 23).

Depending on the electric load on the cell, the valve 22 is programmed to open periodically to vent the exhausted hydrogen from the fuel cell (block 65: SET TIM 1).

A stop procedure may be instigated at any moment in the regulating process as a result of STOP command which may be effected by the operator or by emergency signals (block 66: STOP).

The STOP sequence (stoppage of the system) activates a phase in which the system is depressurised (block 67: ON DEPRESS) by acting on the set points of the valves 12 and 139 which control the progressive opening of the two valves (block 68: SET 12, 139 AT DECREASING PRESS).

This phase is concluded when an absolute pressure of 1.2 bar is reached, read by the pressure sensor 30 (block 69: PT<1.2 BAR?).

At this point the valves 22 and 39 are fully open, the valves 139 and 12 are closed and the recycling units 23 and the compressor 24 stopped (block 70: OPEN 22, 39, CLOSE 12, 139; STOP 23, 24).

A timed washing phase is then started in which the cells are purged with nitrogen (block 71: PURGE), at the end of which (block 72: PURGE TIME END ?) the valves 22 and 39 are closed (block 73: CLOSE 22, 39).

We claim:

1. A supply system for fuel cells of the solid polymer electrolyte for vehicles, comprising a stack of fuel cells, a first subsystem for supplying the cells with hydrogen, a second subsystem for supplying the cells with compressed air and a primary cooling and humidifying circuit for the cells with forced circulation of pressurised, demineralised water, said supply system further comprising:

a secondary cooling circuit with forced circulation of a secondary liquid, including a first liquid/liquid exchanger traversed in countercurrent by the secondary liquid and by the demineralised water of the primary circuit, a second air/liquid heat exchanger traversed by the secondary liquid and the compressed air for cooling the latter to a working temperature for the cells and a radiator traversed by the secondary liquid for cooling it with ambient air.

2. A supply system as claimed in claim 1, in which the primary cooling circuit includes a first three-way valve controlled by a sensor for sensing the temperature of the demineralised water for bypassing the first exchanger.

3. A supply system as claimed in claim 2, in which the secondary cooling circuit includes a second three-way valve controlled by a sensor for sensing the temperature of the compressed air for bypassing the second exchanger.

4. A supply system as claimed in claim 1, in which said second exchanger is located upstream of said first exchanger in the secondary circuit.

5. A supply system as claimed in claim 1, in which the primary circuit includes a pressuriser, pressurised by the compressed air.

6. A supply system as claimed in claim 1, including a reservoir for collecting condensed water from the exhaust gases leaving the air supply subsystem and means for supplementing the demineralised water in the primary circuit with the condensed water.

7. A supply system as claimed in claim 1, in which the hydrogen-supply subsystem includes a hydrogen recycling circuit and a fan in the recycling circuit for reintroducing the partially exhausted hydrogen leaving the cells to the inlet to the cells.

8. A supply system as claimed in claim 7, including a processing unit for controlling the periodic opening of a valve for venting the exhausted hydrogen.

9. A supply system as claimed in claim 1, in which the secondary circuit includes an electric heater releasably connected to the secondary circuit.

10. A supply system as claimed in claim 7, including a processing unit for controlling the activation of the electric heater in a starting phase of the system.

* * * * *